United States Patent
Bao et al.

(10) Patent No.: US 11,328,568 B2
(45) Date of Patent: May 10, 2022

(54) METHOD AND APPARATUS FOR GENERATING INFORMATION, AND DEVICE FOR HUMAN-COMPUTER INTERACTION

(71) Applicants: Baidu.com Times Technology (Beijing) Co., Ltd., Beijing (CN); Baidu USA LLC, Sunnyvale, CA (US)

(72) Inventors: Yingze Bao, Sunnyvale, CA (US); Le Kang, Sunnyvale, CA (US); Yuxuan Luo, Beijing (CN)

(73) Assignees: Baidu.com Times Technology (Beijing) Co., Ltd., Beijing (CN); Baidu USA LLC, Sunnyvale, CA (US)

( * ) Notice: Subject to any disclaimer, the term of this patent is extended or adjusted under 35 U.S.C. 154(b) by 0 days.

(21) Appl. No.: 16/674,492

(22) Filed: Nov. 5, 2019

(65) Prior Publication Data

US 2020/0250949 A1 Aug. 6, 2020

(51) Int. Cl.
| | |
|---|---|
| *G08B 13/00* | (2006.01) |
| *G08B 13/24* | (2006.01) |
| *G08B 13/14* | (2006.01) |
| *G06F 21/32* | (2013.01) |
| *G08B 13/196* | (2006.01) |
| *G06Q 10/08* | (2012.01) |

(52) U.S. Cl.
CPC ......... *G08B 13/2454* (2013.01); *G06F 21/32* (2013.01); *G06Q 10/087* (2013.01); *G08B 13/1472* (2013.01); *G08B 13/19682* (2013.01); *G08B 13/248* (2013.01)

(58) Field of Classification Search
CPC ............ G08B 13/2451; G08B 13/2454; G08B 13/248; G08B 13/1472; G06Q 10/087
See application file for complete search history.

(56) References Cited

U.S. PATENT DOCUMENTS

| | | | |
|---|---|---|---|
| 6,204,763 B1 * | 3/2001 | Sone | A47G 29/141 221/2 |
| 10,007,892 B1 * | 6/2018 | Hahn | H01Q 1/405 |
| 10,332,066 B1 * | 6/2019 | Palaniappan | G01G 19/42 |
| 10,332,183 B1 * | 6/2019 | Dogan | G06Q 10/087 |

(Continued)

FOREIGN PATENT DOCUMENTS

| | | |
|---|---|---|
| JP | 2015/088166 | 5/2015 |
| JP | 2017/076338 | 4/2017 |

(Continued)

OTHER PUBLICATIONS

Japanese Office Action dated Aug. 3, 2021 for Japanese Patent Application No. *********.

*Primary Examiner* — Ojiako K Nwugo
(74) *Attorney, Agent, or Firm* — Knobbe, Martens, Olson & Bear LLP

(57) ABSTRACT

Embodiments of the present disclosure provide a method and apparatus for generating information, a device for human-computer interaction, and a computer readable medium. The method may include: acquiring gravity sensing data of a shelf carrying an item; and identifying, in response to determining that the item on the shelf is taken based on the gravity sensing data, the taken item based on the gravity sensing data and an acquired image of the taken item, and generating order information of the taken item.

19 Claims, 6 Drawing Sheets

(56) References Cited

U.S. PATENT DOCUMENTS

| | | | | |
|---|---|---|---|---|
| 10,810,540 B1* | 10/2020 | Gopal | ................... | G01G 19/387 |
| 10,885,336 B1* | 1/2021 | Davis | ..................... | G06N 7/005 |
| 2013/0235206 A1* | 9/2013 | Smith | .................. | G06Q 10/087 |
| | | | | 348/150 |
| 2018/0137462 A1* | 5/2018 | Zohar | ................ | G06Q 10/0875 |
| 2018/0165626 A1* | 6/2018 | Davidson | ................ | G01F 23/00 |
| 2018/0315116 A1* | 11/2018 | Medina | ............. | G06Q 30/0631 |
| 2019/0130180 A1* | 5/2019 | Shiraishi | ............. | G06Q 10/087 |
| 2019/0215424 A1* | 7/2019 | Adato | ................ | G06K 9/00671 |
| 2019/0295148 A1* | 9/2019 | Lefkow | ............... | G06Q 10/087 |
| 2020/0074402 A1* | 3/2020 | Adato | ................ | G06K 9/00771 |
| 2020/0398434 A1* | 12/2020 | Kim | ........................ | B25J 5/007 |

FOREIGN PATENT DOCUMENTS

| | | | | |
|---|---|---|---|---|
| JP | 2018/206159 | | 12/2018 | |
| WO | WO-2017180752 A1 * | | 10/2017 | ........... G06K 9/2009 |
| WO | WO 2018/143126 | | 8/2018 | |

\* cited by examiner

METHOD AND APPARATUS FOR GENERATING INFORMATION, AND DEVICE FOR HUMAN-COMPUTER INTERACTION

CROSS-REFERENCE TO RELATED APPLICATIONS

This application claims priority to Chinese Patent Application No. 201910105231.1, filed on Feb. 1, 2019, titled "Method and apparatus for generating information, and device for human-computer interaction," which is hereby incorporated by reference in its entirety.

TECHNICAL FIELD

Embodiments of the present disclosure relate to the field of computer technology, specifically to the field of human-computer interaction, and more specifically to a method and apparatus for generating information, and a device for human-computer interaction.

BACKGROUND

Human-computer interaction technology is a technology studying the interaction between users and computerized systems and software. A human-computer interaction device may acquire interaction behavior of a user and provide knowledge or services according to the user's request or potential needs.

With the development of intelligent technology, human-computer interaction is more and more widely used in various scenarios. Vending machine is a typical application of human-computer interaction technology in the retail field. Conventional vending machines are based on cargo lane technology that support goods of specific materials and/or shapes, such as plastic bottles. After the user initiates an interaction request and completes the payment, the goods is dropped from the cargo lane to an opening under the container, and the user takes the goods from the opening.

SUMMARY

Embodiments of the present disclosure provide a method and apparatus for generating information, a device for human-computer interaction and a computer readable medium.

In a first aspect, an embodiment of the present disclosure provides a method for generating information, the method including: acquiring gravity sensing data of a shelf carrying an item; and identifying, in response to determining that the item on the shelf is taken based on the gravity sensing data, the taken item based on the gravity sensing data and an acquired image of the taken item, and generating order information of the taken item.

In some embodiments, the method further includes: acquiring identity information of a current user of the shelf; and associating the order information to the current user of the shelf based on the identity information.

In some embodiments, the identity information of the current user of the shelf is acquired by at least one of: identifying the identity information of the user of the shelf based on acquired biometric information of the current user of the shelf; or acquiring the identity information of the current user of the shelf obtained by scanning an identity code provided by the current user.

In some embodiments, before acquiring gravity sensing data of the shelf carrying an item, the method further includes: opening, in response to successful authentication of the current user of the shelf based on the identity information, a use permission to the shelf.

In some embodiments, the opening a use permission to the shelf, includes: sending an open instruction to a container door for locking the shelf.

In some embodiments, the method further includes: pushing the order information, in response to detecting that the container door is closed.

In some embodiments, the image of the taken item comprises an appearance image of the taken item; the identifying the taken item based on the gravity sensing data and an acquired image of the taken item, includes: determining, based on the gravity sensing data, an amount of gravity change of the shelf after the item is taken; identifying the taken item based on the acquired appearance image of the taken item, and finding a weight of the item identified based on the appearance image in a pre-stored item weight table; and determining that the item identified based on the appearance image is the taken item, in response to determining that the amount of gravity change of the shelf after the item is taken is consistent with the weight of the item identified based on the appearance image.

In some embodiments, the method further includes: generating error prompt information, in response to determining that the amount of gravity change of the shelf after the item is taken is inconsistent with the weight of the item identified based on the appearance image.

In some embodiments, the image of the taken item further comprises an image of an identification code of the taken item; after identifying the taken item based on the acquired appearance image of the taken item, the identifying the taken item based on the gravity sensing data and an acquired image of the taken item, further includes: generating request information requesting the current user to scan the identification code of the taken item, in response to determining that the taken item is not identified from the appearance image; acquiring an image of the identification code provided by the current user in response to receiving the request information, and determining a weight of an item identified by the image of the identification code; and determining that the item identified by the image of the identification code is the taken item, in response to determining that the amount of gravity change of the shelf after the item is taken is consistent with the weight of the item identified by the image of the identification code.

In some embodiments, the method further includes: generating error prompt information, in response to determining that the amount of gravity change of the shelf after the item is taken is inconsistent with the weight of the item identified based on the appearance image.

In some embodiments, the method further includes: detecting whether a gravity increment of the shelf is consistent with a gravity reduction of the shelf detected last time, in response to determining that the item on the shelf is put back based on the gravity sensing data; and generating error prompt information, in response to determining that the gravity increment of the shelf is inconsistent with the gravity reduction of the shelf detected last time.

In a second embodiment, an embodiment of the present disclosure provides an apparatus for generating information, the apparatus including: a first acquisition unit, configured to acquire gravity sensing data of a shelf carrying an item; and a first generation unit, configured to identify, in response to determining that the item on the shelf is taken based on the gravity sensing data, the taken item based on the gravity sensing data and an acquired image of the taken item, and generate order information of the taken item.

In some embodiments, the apparatus further includes a second acquisition unit and an association unit. Where, the second acquisition unit is configured to acquire identity information of a current user of the shelf; and the association unit is configured to associate the order information to the current user of the shelf based on the identity information.

In some embodiments, the identity information of the current user of the shelf is acquired by at least one of: identifying the identity information of the user of the shelf based on acquired biometric information of the current user of the shelf; or acquiring the identity information of the current user of the shelf obtained by scanning an identity code provided by the current user.

In some embodiments, the apparatus further includes an authentication unit, configured to, before acquiring gravity sensing data of a shelf carrying an item, open, in response to successful authentication of the current user of the shelf based on the identity information, a use permission to the shelf.

In some embodiments, the authentication unit is further configured to: send an open instruction to a container door for locking the shelf.

In some embodiments, the apparatus further includes: a pushing unit, configured to push the order information, in response to detecting that the container door is closed.

In some embodiments, the image of the taken item includes an appearance image of the taken item; and the first generation unit is further configured to identify the taken item as follows: determining, based on the gravity sensing data, an amount of gravity change of the shelf after the item is taken; identifying the taken item based on the acquired appearance image of the taken item, and finding a weight of the item identified based on the appearance image in a pre-stored item weight table; and determining that the item identified based on the appearance image is the taken item, in response to determining that the amount of gravity change of the shelf after the item is taken is consistent with the weight of the item identified based on the appearance image.

In some embodiments, the apparatus further includes: a second generation unit, configured to generate error prompt information, in response to determining that the amount of gravity change of the shelf after the item is taken is inconsistent with the weight of the item identified based on the appearance image.

In some embodiments, the image of the taken item further includes an image of an identification code of the taken item; and the first generation unit 602 is further configured to identify the taken item as follows: generating request information requesting the current user to scan the identification code of the taken item, in response to determining that the taken item is not identified from the appearance image; acquiring an image of the identification code provided by the current user in response to receiving the request information, and determining a weight of an item identified by the image of the identification code; and determining that the item identified by the image of the identification code is the taken item, in response to determining that the amount of gravity change of the shelf after the item is taken is consistent with the weight of the item identified by the image of the identification code.

In some embodiments, the apparatus further includes: a third generation unit, configured to generate error prompt information, in response to determining that the amount of gravity change of the shelf after the item is taken is inconsistent with the weight of the item identified by the image of the identification code.

In some embodiments, the apparatus further includes: a detection unit, configured to detect whether a gravity increment of the shelf is consistent with a gravity reduction of the shelf detected last time, in response to determining that the item on the shelf is put back based on the gravity sensing data; and a fourth generation unit, configured to generate error prompt information, in response to determining that the gravity increment of the shelf is inconsistent with the gravity reduction of the shelf detected last time.

In a third aspect, an embodiment of the present disclosure provides a device for human-computer interaction, including one or more processors; and a storage apparatus, for storing one or more programs, where the one or more programs, when executed by the one or more processors, cause the one or more processors to implement the method for generating information.

In some embodiments, the device for human-computer interaction further includes: a shelf for carrying items, the shelf being provided with a gravity sensor for sensing a gravity change of the shelf; and a camera, configured to acquire an image of an item taken from the shelf; and where the processor is further configured to acquire gravity sensing data of the shelf and the image of the item taken from the shelf.

In some embodiments, the device for human-computer interaction further includes: an electronic screen, configured to provide an interaction interface to a user of the device for human-computer interaction; and the processor is further configured to acquire identity information of the user through the interaction interface provided by the electronic screen, and associate generated order information to the user based on the identity information of the user.

In some embodiments, the camera is further configured to acquire biometric information of the user; the processor is further configured to determine the identity information of the user based on the biometric information of the user, and associate the generated order information to the user based on the identity information of the user.

In some embodiments, the device for human-computer interaction further includes: a container door, configured to lock the shelf, and an electronic lock is arranged on the container door; the processor is further configured to send an open instruction to the electronic lock on the container door, in response to a successful authentication of the user of the shelf based on the identity information.

In a fourth aspect, an embodiment of the present disclosure provides a computer readable medium, storing a computer program thereon, where the program, when executed by a processor, implements the method for generating information.

The method and apparatus for generating information, the device for human-computer interaction, and the computer readable medium of the embodiments of the present disclosure, by acquiring gravity sensing data of a shelf carrying an item; and identifying, in response to determining that the item on the shelf is taken based on the gravity sensing data, the taken item based on the gravity sensing data and an acquired image of the taken item, and generating order information of the taken item, realize item ordering behavior identification based on the gravity sensing data of the shelf and the item image, and may be applied to various materials and shapes, thereby improving the accuracy of generated order information.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
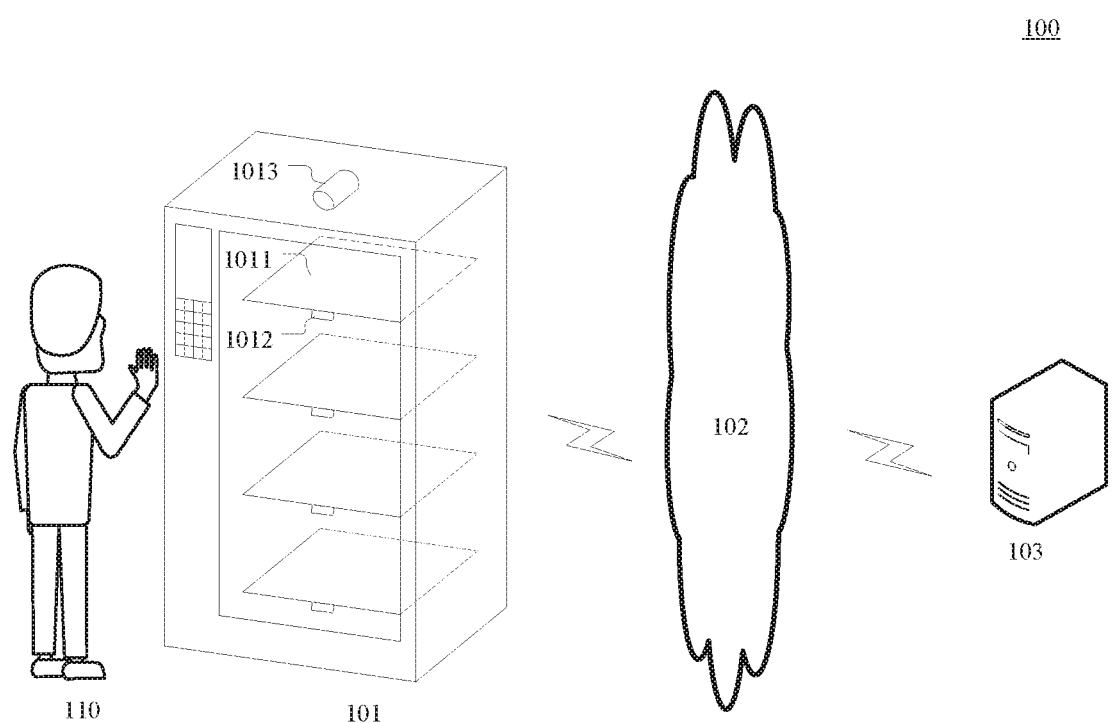
FIG. 1 is a diagram of an example system architecture in which some embodiments of the present disclosure may be implemented.

FIG. 1 illustrates an exemplary system architecture in which a method for generating information or an apparatus for generating information of some embodiments of the present disclosure may be implemented.

As shown in FIG. 1, the system architecture 100 may include a vending device 101, a network 102, and a server 103. The network 102 is used to provide a communication link medium between the vending device 101 and the server 103. The network 102 may include various types of connections, such as wired, wireless communication links, or optic fibers.

The vending device 101 may include at least one shelf 1011 for carrying items, and a gravity sensor 1012 may be disposed on each shelf 1011. The gravity sensor 1012 may be used to sense a weight change of items carried by the shelf. A camera 1013 may also be provided on the vending device 101. The camera 1013 is for acquiring an image of a usage scene of the vending device 101. In an application scenario of the present disclosure, the imaging range of the camera 1013 may cover the shelf 1011 or the area of use of the entire vending device 101.

The user 110 may autonomously complete goods selection and settlement using the vending device 101. The vending device 101 may interact with the server 103 via the network 102 to send or receive messages. The vending device 101 may package data acquired by the gravity sensor 1012 and the camera 1013 to generate a processing request, and send a processing request to the server 103 via the network 102. The server 103 may be a backend server that provides support for the vending device 101. The server 103 may receive and parse the processing request, determine the item(s) purchased by the user (i.e., a user 110) of the vending device 101 based on the data acquired by the gravity sensor 1012 and the camera 1013, and generate order information. In some scenarios, the server 103 may also feed back the generated order information to the vending device 101 via the network 103.

In some scenarios, the vending device 101 may also be provided with a data processing component such as a CPU, or a GPU, and a storage component. The data processing component may acquire and process the data sensed by the gravity sensor 1012 and the camera 1013, and the storage component may store the data sensed by the sensor and store the data that the data processing component needs to call to perform a data processing task.

It should be noted that the server 103 may be hardware or software. When the server 103 is hardware, the server 103 may be implemented as a distributed server cluster composed of a plurality of servers, or may be implemented as a single server. When the server 103 is software, the server 103 may be implemented as a plurality of programs or software modules (for example, a plurality of programs or software modules for providing distributed services), or as a single software or software module, which is not specifically limited herein.

It should be noted that the method for generating information provided by some embodiments of the present disclosure may be performed by the data processing component provided in the vending device 101 or the server 103. Accordingly, the apparatus for generating information may be disposed in the data processing component of the vending device 101 or the server 103.

It should be understood that the number of vending devices, shelves, gravity sensors, cameras, networks and servers in FIG. 1 is merely illustrative. Depending on the implementation needs, there may be any number of vending devices, shelves, gravity sensors, cameras, networks and servers.

Figure 2:
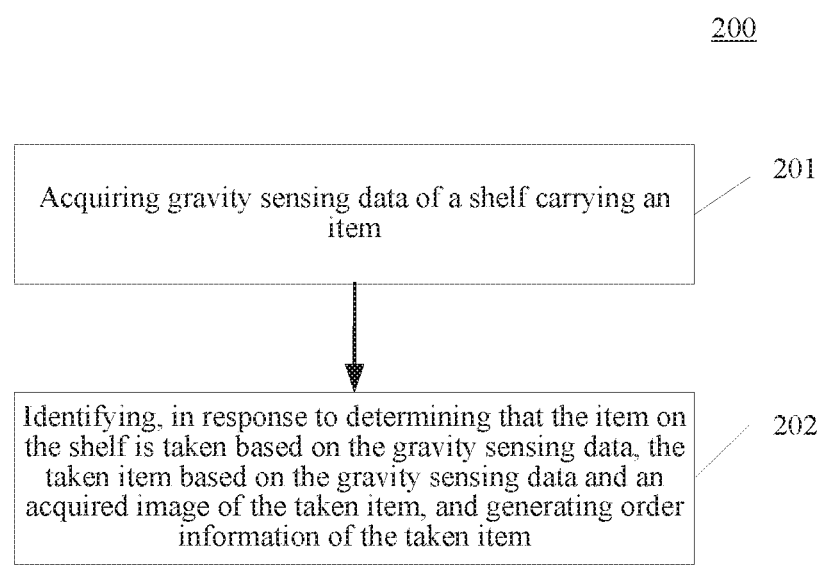
FIG. 2 is a flowchart of a method for generating information according to an embodiment of the present disclosure.

With further reference to FIG. 2, a flow 200 of an embodiment of a method for generating information according to the present disclosure is illustrated. The method for generating information includes the following steps, Step 201, acquiring gravity sensing data of a shelf carrying an item.

In the present embodiment, an executing body of the method for generating information may be connected to a gravity sensor disposed on the shelf to acquire the gravity sensing data of the shelf transmitted by the gravity sensor. For example, the executing body of the method for generating information may be a processing component within the vending device, and the processing component may acquire the gravity sensing data of the shelf from the gravity sensor.

The executing body of the method for generating information may alternatively be connected to a vending device or a vending system including the above shelf, and the vending device or the vending system may acquire the gravity sensing data generated by the gravity sensor on the shelf, and then transmit the gravity sensing data of the shelf to the executing body. For example, after the vending device acquires the gravity sensing data generated by the gravity sensor, the vending device may transmit the acquired gravity sensing data to the server for performing the method for generating information.

The shelf may carry items to be traded, and the weight of the items carried on the shelf may be pre-recorded. The gravity sensing data of the shelf changes as an item on the shelf is taken or put back.

In the present embodiment, the gravity sensing data of the shelf may be acquired in response to detecting a preset triggering operation. Here, the preset triggering operation may be an operation of the user having an item purchase intention. For example, an operation that the user opens the container door of the vending machine, or an operation that the user enters the use area of the shelf by scanning the code or the like. The gravity sensing data may alternatively be acquired in real time in response to detecting a change in the gravity sensing data, in this way, the gravity data may be used to know in time that an item on the shelf is taken or returned.

Step 202, identifying, in response to determining that the item on the shelf is taken based on the gravity sensing data, the taken item based on the gravity sensing data and an acquired image of the taken item, and generating order information of the taken item.

In the present embodiment, the gravity sensing data of the shelf acquired in step 201 may be compared with gravity data of the shelf acquired last time recorded in a database. If the gravity sensing data of the shelf acquired in step 201 is inconsistent with the gravity data of the shelf acquired last time recorded in the database, it may be determined that the item on the shelf is taken or put back. Specifically, if the gravity sensing data of the shelf acquired in step 201 is lower than the gravity data of the shelf acquired last time recorded in the database, that is, the gravity data of the shelf reduces, and it is determined that the item on the shelf is taken.

In this case, the taken item may be identified based on the gravity sensing data of the shelf and the acquired image of the taken item.

Specifically, the amount of change in the gravity data of the shelf may be first calculated from the gravity sensing data and the gravity data of the shelf recorded in the database, and the amount of change is used as the weight value of the taken item.

Then, the item matching the weight value is found as a candidate item or a combination of candidate items in a pre-stored item information database. For example, if the amount of change in the gravity data of the shelf is 150 grams, then a single item having a weight of 150 grams may be found as the candidate item from the item information database, or a combination of two or more items having a total weight of 150 grams may be found as the combination of candidate items. Here, the item information database may store item weight information of all the items on the shelf, as well as images and/or image features of all the items on the shelf.

Then, image identification may be performed on the taken item in the acquired image of the taken item. Specifically, the image of the taken item may be matched with the image of the candidate item or the images of the items in the combination of candidate items, or features may be extracted from the image of the taken item, and matched with the image features of the item in the candidate item or the image features of the items in the combination of candidate items. Based on a matching result of the images or the image features, it is identified that the item in the image of the taken item is consistent with which candidate item/which combination of candidate items, and an identification result of the taken item is obtained.

By first designating the range of the candidate item or the combination of candidate items based on the weight change of the shelf, and then matching the acquired image of the taken item within the range, the matching range is effectively reduced, and the matching efficiency may be improved.

In some alternative implementations of the present embodiment, the image of the taken item is acquired during the taking of the item, or the user may voluntarily put the item in the imaging area of the camera so that the camera may capture an image of the taken item. Then, the image of the taken item may be transmitted to the executing body of the method for generating information.

In some alternative implementations of the present embodiment, the executing body may also acquire the image of the taken item by requesting user assistance. Specifically, in response to detecting that the gravity sensing data of the shelf indicates that an item on the shelf is taken, the executing body generates request information for requesting acquisition of an image of the taken item, and displays the request information in the form of text, picture, voice, or the like. The user who takes the item may put the taken item within the imaging range of the camera after receiving the request information, and the camera images the taken item and transmits the image to the executing body.

In some scenarios, the image of the taken item is acquired during the taking of the item. For example, in a typical scenario of vending—an unattended shop, the camera may acquire an image of the customer taking an item from the shelf. In this case, the image of the taken item further includes interference information such as a person and a shelf. In this case, the acquired image of the taken item may be preprocessed to extract image information of the area where the taken item is located. For example, the user generally takes an item directly from the shelf by hand. The hand area may be extracted, and then the item is searched in the peripheral area of the hand area to obtain an image of the taken item. Then, the image of the taken item is matched with the image or image features of the candidate item, or matched with the images or image features of the items in the combination of candidate items.

In some embodiments, the image of the taken item may include an appearance image of the taken item, and in this case, the taken item may be identified based on the gravity sensing data and the appearance image of the taken item as follows: determining, based on the gravity sensing data, an amount of gravity change of the shelf after the item is taken; identifying the taken item based on the acquired appearance image of the taken item, and finding a weight of the item identified based on the appearance image in a pre-stored item weight table; and determining that the item identified based on the appearance image is the taken item, in response to determining that the amount of gravity change of the shelf after the item is taken is consistent with the weight of the item identified based on the appearance image. Here, if the difference between the weight of the item identified based on the appearance image and the amount of gravity change of the shelf is 0, or the difference between the two is within a certain range (for example, within 5%), it may be determined that the weight of the item identified based on the appearance image is consistent with the amount of gravity change of the shelf.

Specifically, after determining the amount of gravity change of the shelf, an image recognition algorithm may be used to identify the appearance image of the taken item, and identify item characteristic attributes including an item type, an item packaging specification, a brand identification, and the like, for example identifying that the item is 200 grams of yogurt of the brand A. The item having the matching item characteristic attributes is then found in the pre-stored item information database as the item identified based on the appearance image. Then, it may be determined whether the weight of the item identified based on the appearance image matches the amount of gravity change of the shelf, and in the affirmative, it is determined that the item identified based on the appearance image is the taken item.

Since the appearance image usually includes key features such as the name, the color, and the logo of the brand (e.g., the trademark) of the item, the item in the image may be identified based on these key features, and the taken item is determined in conjunction with the weight change of the shelf, which may further improve the accuracy of identifying the taken item.

Alternatively, the flow of the method for generating information may further include: generating error prompt information, in response to determining that the amount of gravity change of the shelf after the item is taken is inconsistent with the weight of the item identified based on the appearance image. That is, if the weight of the item identified based on the appearance image is inconsistent with the amount of gravity change of the shelf, an error prompt may be made. The error prompt information may be preset, and may be prompt information in the form of voice, text, picture, or the like. Alternatively, the error prompt information may include information for prompting that the weight of the item identified based on the appearance image is inconsistent with the amount of gravity change of the shelf to feed back the cause of the error to the user.

In some alternative implementations, the image of the taken item may further include an image of an identification code of the taken item. Here, the identification code of the item may be a graphic identification code for identifying the item such as a barcode, or a QR code, or may be a digital identification code such as a stock number of the item, or a digital sequence corresponding to the barcode or the QR code of the item.

After identifying the taken item based on the acquired appearance image of the taken item, the taken item may alternatively be identified as follows.

First, generating request information requesting the current user to scan the identification code of the taken item, in response to determining that the taken item is not identified from the appearance image. If the identification result of the item identified from the appearance image is "no item matched", preset request information requesting the current user to scan the identification code of the taken item may be generated.

Then, the current user may put the identification code of the item in the acquisition area of an image acquisition apparatus (for example, the camera) to perform identification code reading in response to receiving the request information. The image acquisition apparatus may acquire an image of the identification code. The executing body may acquire the image of the identification code provided by the current user in response to receiving the request information, identify the identification code based on the image of the identification code, and find the item identified by the identification code in the item information database, thereby determining the weight of the item identified by the image of the identification code.

After that, it may be determined that whether the amount of gravity change of the shelf after the item is taken is consistent with the weight of the item identified by the image of the identification code, and determine that the item identified by the image of the identification code is the taken item, in response to determining that the amount of gravity change of the shelf after the item is taken is consistent with the weight of the item identified by the image of the identification code.

The image of the identification code generally only includes identification code information, having no complicated background noise, and the item can be accurately identified based on the identification code. In addition, the behavior of the user voluntarily providing the image of the identification code may characterize an intention of purchasing the item, so that adding the item identified by the image of the identification code to the order is consistent with the user's intention. By requesting the current user to provide the image of the identification code of the taken item when identifying the item based on the appearance image fails, the taken item is identified based on the image of the identification code and the weight change of the shelf, which not only provides richer item identification methods, but also improves the accuracy of identifying the taken item.

Alternatively, the flow of the method for generating information may further include: generating error prompt information, in response to determining that the amount of gravity change of the shelf after the item is taken is inconsistent with the weight of the item identified by the image of the identification code. The error prompt information may be preset, and may be prompt information in the form of voice, text, picture, or the like. Alternatively, the error prompt information may include information for prompting that the weight of the item identified based on the image of the identification code is inconsistent with the amount of gravity change of the shelf to feed back the cause of the error to the user.

After identifying the taken item, order information of the taken item may be generated. Specifically, the taken item may be added to an order list. Alternatively, detailed information of the taken item, such as name of the item, package specification, place of production, brand, price, or special offer information, may also be acquired to generate the order information.

An application scenario of the above embodiment of the present disclosure may be: when the user selects an item to purchase in an unattended shop or a vending machine, the gravity sensor on the shelf may sense the gravity sensing data of the shelf and transmit the gravity sensing data of the shelf to a processing component, and the processing component may also acquire an image of the taken item by a camera for acquiring an image of usage scene set in the unattended shop or on the vending machine. Then, the processing component may identify the taken item in conjunction with the gravity sensing data of the shelf and the image of the taken item, and then generate the order information for the taken item. In this way, it is realized that an item order behavior is identified by the weight of the shelf and the image of the taken item and an order is generated.

The method for generating information of the embodiments of the present disclosure, by acquiring gravity sensing data of a shelf carrying an item; and identifying, in response to determining that the item on the shelf is taken based on the gravity sensing data, the taken item based on the gravity sensing data and an acquired image of the taken item, and generating order information of the taken item, realizes item ordering behavior identification based on the gravity sensing data of the shelf and the item image, which is suitable for various materials and shapes. At the same time, the accuracy of generated order information is improved by identifying the item by combining information of the gravity sensing data and the image.

Figure 3:
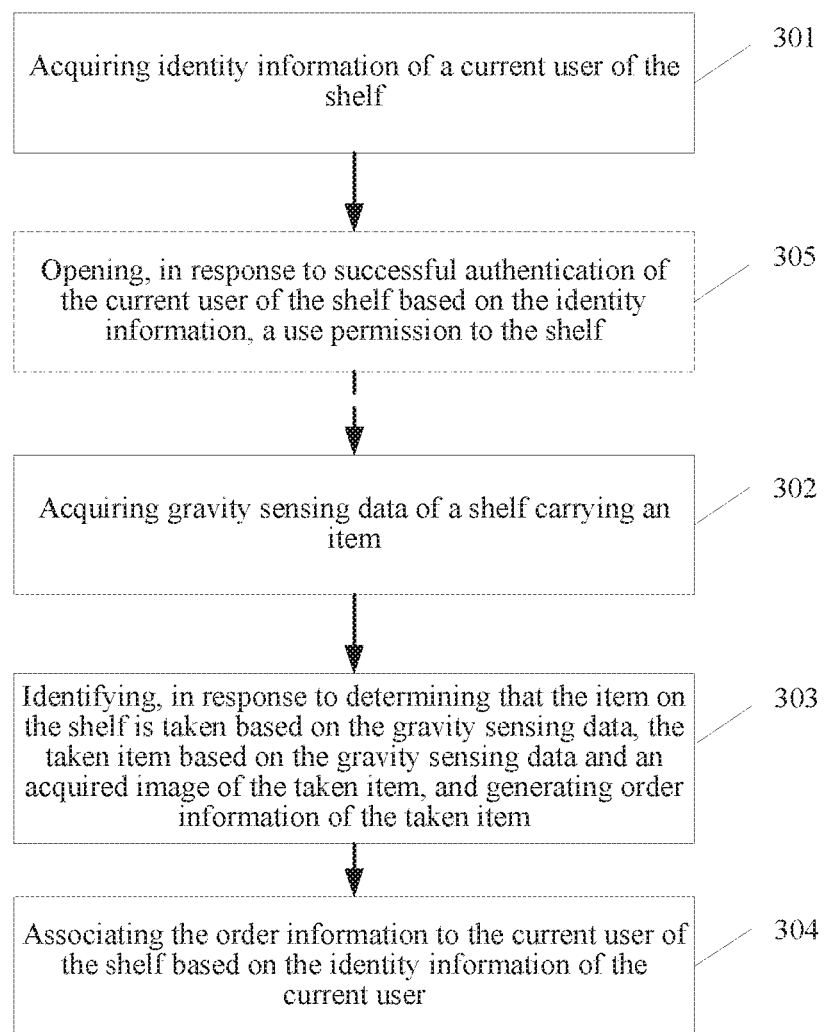
FIG. 3 is a flowchart of the method for generating information according to another embodiment of the present disclosure.

With further reference to FIG. 3, a flowchart of the method for generating information according to another embodiment of the present disclosure is illustrated. As shown in FIG. 3, a flow 300 of the method for generating information of the present embodiment includes the following steps.

Step 301, acquiring identity information of a current user of the shelf.

The identity information of the user is information characterizing the identity of the user, and may be a user ID (Identity) of the user. The identity information of the current user of the shelf may be acquired in a variety of ways. For example, the user ID input by the user may be acquired through an interaction interface, or an access portal such as a QR code may be provided. After the user sends an access request by scanning the QR code, user information such as the user ID of the user may be acquired.

In some alternative implementations of the present embodiment, the identity information of the user may also be an identification code for identifying the identity of the user or a biometric identifier of the user (e.g., facial feature encoding, fingerprint feature encoding, voiceprint feature encoding). The identity information of the current user of the shelf may be acquired as follows: identifying the identity information of the user of the shelf based on acquired biometric information of the current user of the shelf, for example, acquiring a face image of the current user and performing face recognition; and/or acquiring the identity information of the current user of the shelf obtained by scanning an identity code provided by the current user. For example, in an actual scenario, the user may present the identity code (for example, a generated QR code of a registered user). The identity code may be scanned and a scan result may be transmitted to the executing body.

Step 302, acquiring gravity sensing data of a shelf carrying an item.

The shelf may carry items to be traded, and the weight of the items carried on the shelf may be pre-recorded. The gravity sensing data of the shelf changes as an item on the shelf is taken or put back. The gravity sensing data of the shelf may be acquired in real time when the gravity sensing data of the shelf changes, and the gravity sensing data of the shelf may also be acquired periodically.

Step 303, identifying, in response to determining that the item on the shelf is taken based on the gravity sensing data, the taken item based on the gravity sensing data and an acquired image of the taken item, and generating order information of the taken item.

The gravity sensing data of the shelf acquired in step 302 may be compared with gravity data of the shelf acquired last time recorded in a database, and if the weight of the shelf is reduced, it may be determined that the item on the shelf is taken. In this case, the taken item may be identified by combining the gravity sensing data of the shelf and the acquired image of the taken item. Specifically, the image identification method may be used to identify the taken item, and then the gravity sensing data is used in combination to determine whether the image-based identification result is accurate; or the weight of the taken item may be first determined based on the gravity sensing data, and the matching is performed using the image in the candidate item or a set of candidate items that satisfy the weight.

The step 302 and step 303 of the present embodiment are respectively consistent with step 201 and step 202 of the foregoing embodiment, specific implementations and alternative implementations of step 302 and step 303, a description of an embodiment expanded based on the alternative implementations of step 302 and step 303 may respectively refer to the description of step 201, step 202 and the related content in the foregoing embodiment, and detailed description thereof will be omitted.

Step 304, associating the order information to the current user of the shelf based on the identity information of the current user.

The order information generated in step 303 may be associated with the identity information of the current user acquired in step 301. In this way, the order information may be associated to the corresponding user, and the flow of order generation is improved. After receiving the order information, the user may perform an operation such as payment, or evaluation on the order.

In the present embodiment, the order may be automatically associated with the user, and the identity information of the user may effectively distinguish the orders of different users, thereby realizing safer and more accurate order generation. Moreover, since the generated order information is associated to the user whose identity information has been acquired, the user may freely select the time of payment or evaluation, which increases the flexibility of an order related operation.

Alternatively, before step 302, the flow 300 of the method for generating information further includes the following step.

Step 305, opening, in response to successful authentication of the current user of the shelf based on the identity information, a use permission to the shelf.

The identity information acquired in step 301 may be used to authenticate the current user. The executing body may acquire a user list having use permission in advance, and then determine, based on the identity information of the current user, whether the current user has the use permission to the shelf.

The user list having use permission may be a list of users satisfying a preset condition. For example, in actual application, the user list having use permission may include a list of users who have registered on an unattended platform, may include a list of users who have completed real-name authentication, and may also include a list of users who do not have an unsettled order, or the like.

If it is determined that the current user is in the list of users having use permission, the use permission to the shelf may be opened. After opening the use permission to the shelf, the shelf may be switched from a locked state to an open state, and an open instruction may also be sent to the gravity sensor on the shelf and the camera for acquiring an image of the item on the shelf to provide a vending service.

Alternatively, the opening a use permission to the shelf, includes: sending an open instruction to a container door for locking the shelf. The vending system may also include a container door that may be used to lock the shelf, and an electronic lock may be arranged on the container door. An open instruction may be sent to the electronic lock on the container door. In this way, after the user passes the authority check, the container door is opened, which can ensure that the shelf may not be used by users without permission, thereby improving security.

Further and alternatively, after step 304, the flow 300 of the method for generating information further includes: pushing the order information, in response to detecting that the container door is closed. After the user completes the item selection, the container door may be closed. When it is detected that the electronic lock of the container door is restored to the closed state, it may be determined that the current user completes the ordering behavior. The generated order information may be pushed to the current user's electronic device, or the generated order information may be pushed to a display device such as an electronic screen disposed on the container for display to help the current user accurately know the status of the order.

Figure 4:
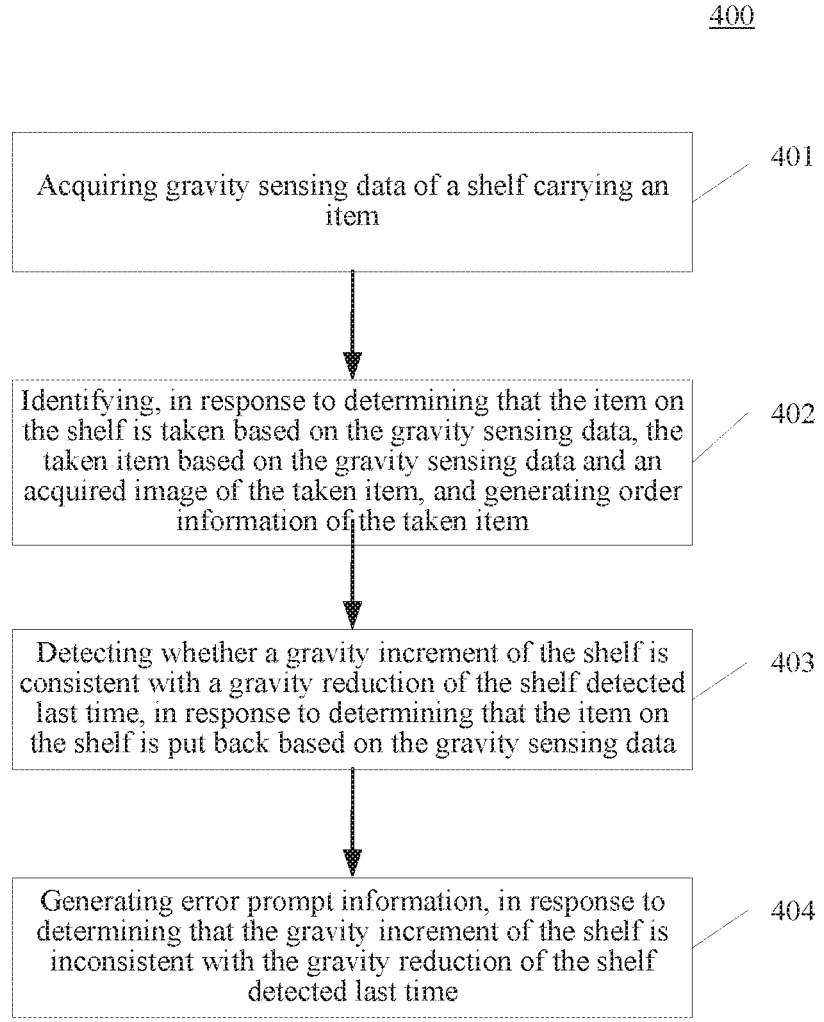
FIG. 4 is a flowchart of the method for generating information according to a further embodiment of the present disclosure.

With further reference to FIG. 4, a flow of the method for generating information according to a further embodiment of the present disclosure is illustrated. As shown in FIG. 4, a flow 400 of the method for generating information of the present embodiment includes the following steps.

Step 401, acquiring gravity sensing data of a shelf carrying an item.

The shelf may carry items to be traded, and the weight of the items carried on the shelf may be pre-recorded. The gravity sensing data of the shelf changes as an item on the shelf is taken or put back. The gravity sensing data of the shelf may be acquired in real time when the gravity sensing data of the shelf changes, and the gravity sensing data of the shelf may also be acquired periodically.

Step 402, identifying, in response to determining that the item on the shelf is taken based on the gravity sensing data, the taken item based on the gravity sensing data and an acquired image of the taken item, and generating order information of the taken item.

The gravity sensing data of the shelf acquired in step 401 may be compared with gravity data of the shelf acquired last time recorded in a database, and if the weight of the shelf is reduced, it may be determined that the item on the shelf is taken. In this case, the taken item may be identified by combining the gravity sensing data of the shelf and the acquired image of the taken item. Specifically, the image identification method may be used to identify the taken item, and then the gravity sensing data is used in combination to determine whether the image-based identification result is accurate; or the weight of the taken item may be first determined based on the gravity sensing data, and the matching is performed using the image in the candidate item or a set of candidate items that satisfy the weight.

The step 401 and step 402 of the present embodiment are respectively consistent with step 201 and step 202 of the foregoing embodiment, specific implementations and alternative implementations of step 401 and step 402, a description of an embodiment expanded based on the alternative implementations of step 401 and step 402 may respectively refer to the description of step 201, step 202 and the related content in the foregoing embodiment, and detailed description thereof will be omitted.

Step 403, detecting whether a gravity increment of the shelf is consistent with a gravity reduction of the shelf detected last time, in response to determining that the item on the shelf is put back based on the gravity sensing data.

The gravity sensing data of the shelf acquired in step 401 may be compared with gravity data of the shelf acquired last time recorded in a database. If the gravity sensing data of the shelf acquired in step 401 is higher than the gravity data of the shelf acquired last time recorded in the database, that is, a gravity data value of the shelf increases, and it is determined that the item on the shelf is put back.

It may be further determined whether the gravity increment of the shelf is consistent with the gravity reduction of the shelf detected last time. In a specific application scenario, if the item on the shelf is taken and then put back on the shelf, the gravity value of the gravity sensing data of the shelf first reduces and then increases, and the amount of gravity value reduction is consistent with the amount subsequently increased. Then, by determining that the gravity increment of the shelf is consistent with the gravity reduction of the shelf detected last time, it is determined whether the user takes the item and then puts it back on the shelf. If the two are consistent, it may be determined that the item taken from the shelf is then put back. In this case, it is possible to return to step 401 to continue to acquire the gravity sensing data of the shelf and detecting whether the gravity sensing data reduces or increases to determine that the item is taken or put back.

Alternatively, when it is determined that the user takes the item and then puts it back to the shelf, it may be determined that the user gives up placing an order for the taken item, and the generated order information may be deleted to avoid wrong order generation, further ensuring that the generated order information is consistent with the user's operation behavior and user intent.

Step 404, generating error prompt information, in response to determining that the gravity increment of the shelf is inconsistent with the gravity reduction of the shelf detected last time.

In the present embodiment, if it is detected the gravity increment of the shelf is inconsistent with the gravity reduction of the shelf detected last time, the error prompt information may be generated. The error prompt information may be preset, and may be used to prompt the user that the generated order information is in doubt.

In the actual scenario, if it is detected that the gravity increment of the shelf is inconsistent with the gravity reduction of the shelf detected last time, the data acquired such as the gravity sensing data of the shelf, or the image of the taken item may also be transmitted to the backend server. The server may further analyze the data or manually determine whether the generated order information is valid, thereby avoiding the user's loss caused by generating a wrong order, and ensuring that the order information includes the item taken by the user and no omission occurs, which helps to improve the reliability of the order information.

It should be noted that, in some alternative implementations of the embodiment shown in FIG. 4, the flow 400 of the method for generating information may also include step 301, step 304, step 305 in the foregoing flow 300, and the step of pushing the order information, in response to detecting that the container door is closed. For a specific implementation, reference may be made to the description of the embodiment shown in FIG. 3, and repeated description thereof will be omitted.

Figure 5:
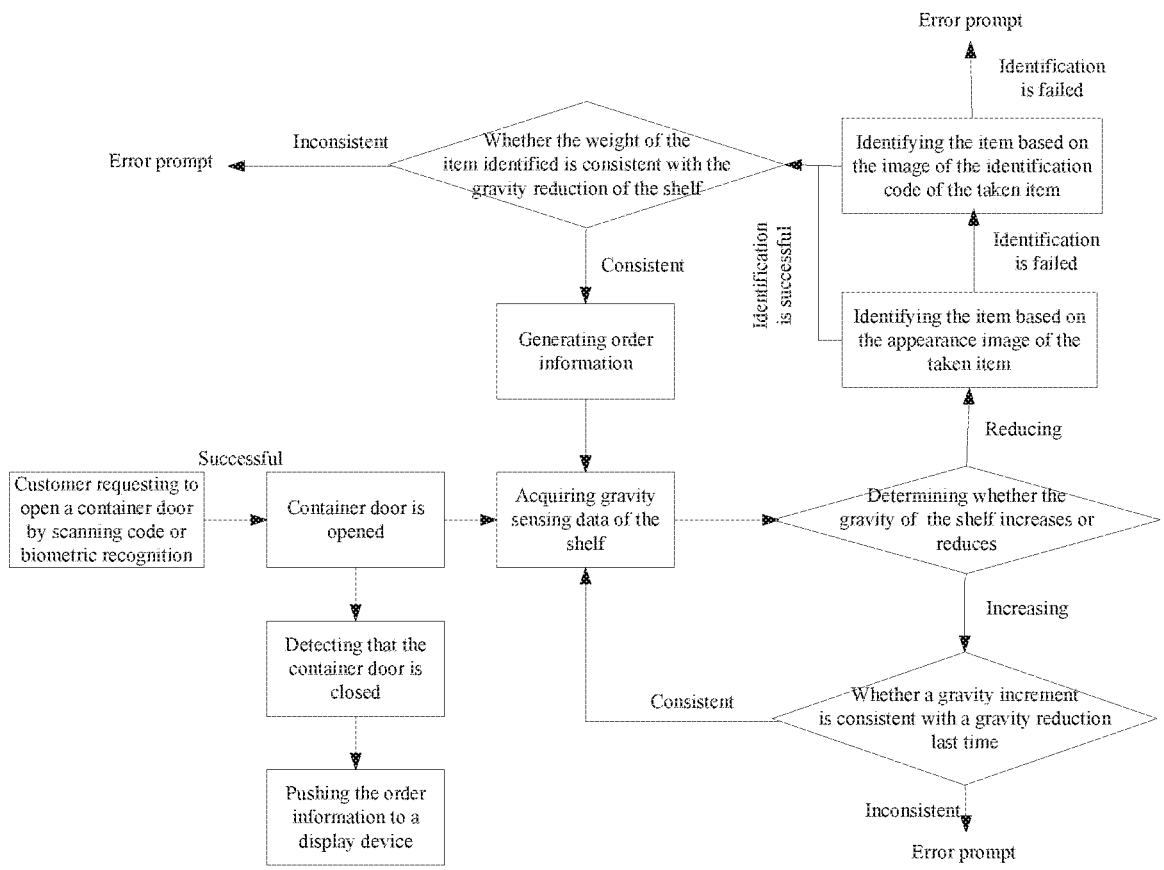
FIG. 5 is a schematic flowchart of an actual application scenario of the method for generating information according to an embodiment of the present disclosure.

With further reference to FIG. 5, FIG. 5 illustrates a schematic flowchart of an actual application scenario of the method for generating information according to an embodiment of the present disclosure.

As shown in FIG. 5, first, a customer requests to open a container door by scanning code or face recognition, and after the request is successful, the container door is opened. In this case, the gravity sensing data of the shelf may be acquired, and then it is determined whether the gravity of the shelf increases or reduces based on the gravity sensing data. If the gravity of the shelf reduces, an appearance image of the item being taken is acquired, and the item is identified based on the appearance image. If the identifying based on the appearance image fails, an image of the identification code of the taken item may be further acquired by prompting the user to scan the identification code of the item, and the item is identified by the image of the identification code. If the identifying the item based on the image of the identification code fails, an error prompt is generated. If the item is successfully identified based on the appearance image or based on the image of the identification code, it may be further determined whether the weight of the identified item is consistent with the gravity reduction of the shelf, and if it is consistent, order information of the item is generated. If the weight of the identified item does not match the gravity reduction of the shelf, an error prompt may be made.

After acquiring the gravity sensing data of the shelf, if it is determined that the gravity of the shelf increases, it is further determined whether the amount of gravity increase is consistent with the previous reduction amount. If it is consistent, it may be determined that the customer puts the item back to the shelf after taking the item, and return to the step of acquiring the gravity sensing data of the shelf, and changes in the gravity sensing data of the shelf is continuously detected before the container door is closed. If the amount of gravity increase on the shelf is inconsistent with the previous reduction amount, an error prompt may also be made.

After detecting that the container door is closed, the generated order information may be pushed to a display device such as the customer's mobile phone, or the electronic display of the container door, to inform the customer of the order result.

In the actual application scenario, after generating the error prompt information, the related information may be sent to a service desk for manual verification. The monitoring staff of the service desk may determine whether to associate the order to the customer's account based on the image, the gravity sensing data, and the like.

Figure 6:
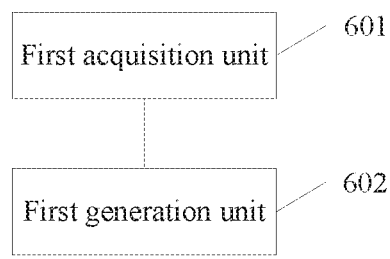
FIG. 6 is a schematic structural diagram of an apparatus for generating information according to an embodiment of the present disclosure.

With further reference to FIG. 6, as an implementation of the method shown in the above figures, an embodiment of the present disclosure provides an apparatus for generating information, and the apparatus embodiment corresponds to the method embodiments as shown in FIG. 2, FIG. 3 and FIG. 4. The apparatus may be specifically applied to various electronic devices.

As shown in FIG. 6, an apparatus 600 for generating information of the present embodiment includes: a first acquisition unit 601 and a first generation unit 602. The first acquisition unit 601 is configured to acquire gravity sensing data of a shelf carrying an item. The first generation unit 602 is configured to identify, in response to determining that the item on the shelf is taken based on the gravity sensing data, the taken item based on the gravity sensing data and an acquired image of the taken item, and generate order information of the taken item.

In some embodiments, the apparatus 600 may further include a second acquisition unit and an association unit. Here, the second acquisition unit is configured to acquire identity information of a current user of the shelf; and the association unit is configured to associate the order information to the current user of the shelf based on the identity information.

In some embodiments, the identity information of the current user of the shelf is acquired by at least one of: identifying the identity information of the user of the shelf based on acquired biometric information of the current user of the shelf; or acquiring the identity information of the current user of the shelf obtained by scanning an identity code provided by the current user.

In some embodiments, the apparatus 600 may further include an authentication unit, configured to, before acquiring gravity sensing data of a shelf carrying an item, open, in response to successful authentication of the current user of the shelf based on the identity information, a use permission to the shelf.

In some embodiments, the authentication unit is further configured to: send an open instruction to a container door for locking the shelf.

In some embodiments, the apparatus 600 may further include: a pushing unit, configured to push the order information, in response to detecting that the container door is closed.

In some embodiments, the image of the taken item includes an appearance image of the taken item; and the first generation unit 602 is further configured to identify the taken item as follows: determining, based on the gravity sensing data, an amount of gravity change of the shelf after the item is taken; identifying the taken item based on the acquired appearance image of the taken item, and finding a weight of the item identified based on the appearance image in a pre-stored item weight table; and determining that the item identified based on the appearance image is the taken item, in response to determining that the amount of gravity change of the shelf after the item is taken is consistent with the weight of the item identified based on the appearance image.

In some embodiments, the apparatus further includes: a second generation unit, configured to generate error prompt information, in response to determining that the amount of gravity change of the shelf after the item is taken is inconsistent with the weight of the item identified based on the appearance image.

In some embodiments, the image of the taken item further includes an image of an identification code of the taken item; and the first generation unit 602 is further configured to identify the taken item as follows: generating request information requesting the current user to scan the identification code of the taken item, in response to determining that the taken item is not identified from the appearance image; acquiring an image of the identification code provided by the current user in response to receiving the request information, and determining a weight of an item identified by the image of the identification code; and determining that the item identified by the image of the identification code is the taken item, in response to determining that the amount of gravity change of the shelf after the item is taken is consistent with the weight of the item identified by the image of the identification code.

In some embodiments, the apparatus further includes: a third generation unit, configured to generate error prompt information, in response to determining that the amount of gravity change of the shelf after the item is taken is inconsistent with the weight of the item identified by the image of the identification code.

In some embodiments, the apparatus 600 further includes: a detection unit, configured to detect whether a gravity increment of the shelf is consistent with a gravity reduction of the shelf detected last time, in response to determining that the item on the shelf is put back based on the gravity sensing data; and a fourth generation unit, configured to generate error prompt information, in response to determining that the gravity increment of the shelf is inconsistent with the gravity reduction of the shelf detected last time.

It should be understood that the units recited in the apparatus 600 correspond to the various steps in the method described with reference to FIG. 2, FIG. 3, and FIG. 4. Thus, the operations and features described above for the method are equally applicable to the apparatus 600 and the units contained therein, and detailed description thereof will be omitted.

The apparatus 600 for generating information of the above embodiment of the present disclosure improves the accuracy of the order information by combining the gravity sensing data of the shelf and the image of the item taken from the shelf to identify the item for which the user places an order, and is applicable to items of various materials and shapes, expanding the scope of use of the vending scenarios.

Figure 7:
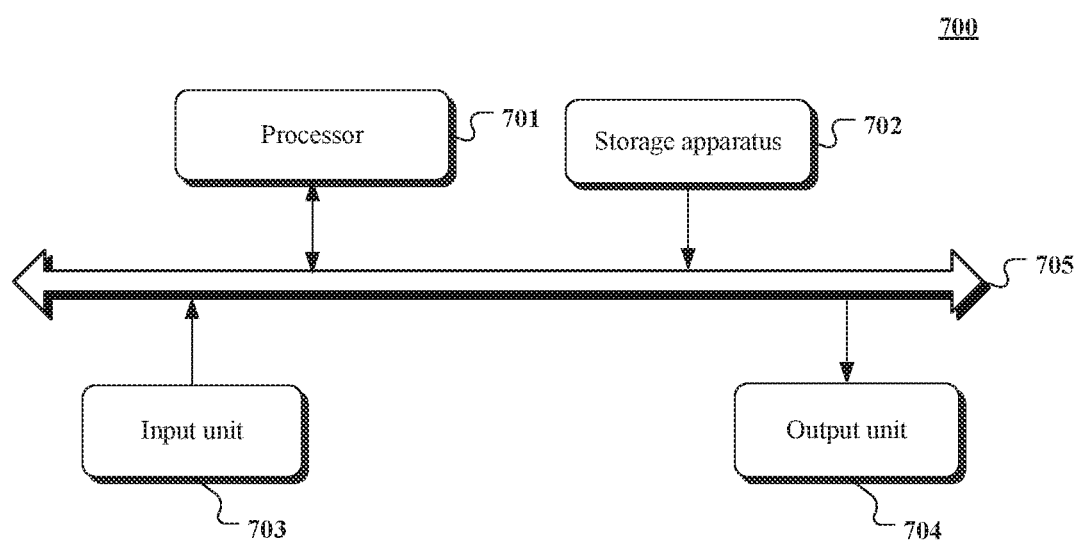
FIG. 7 is a schematic structural diagram of a device for human-computer interaction adapted to implement the embodiments of the present disclosure.

Embodiments of the present disclosure also provide a device for human-computer interaction. With reference to FIG. 7, a schematic hardware structural diagram of a device for human-computer interaction of an embodiment of the present disclosure is shown. In a specific implementation, the device for human-computer interaction may be a vending device or server in the system architecture as shown in FIG. 1.

As shown in FIG. 7, a device 700 for human-computer interaction includes a processor 701 such as a CPU (Central Processing Unit) or a GPU (Graphics Processing Unit), a storage apparatus 702, an input unit 703, and an output unit 704. The processor 701, the storage apparatus 702, the input unit 703, and the output unit 704 are connected to each other through a bus 705. Here, the method according to the embodiments of the present disclosure may be implemented as a computer program and stored in the storage apparatus 702. The processor 701 in the device 700 for human-computer interaction specifically implements an information generating function defined in the method of the embodiments of the present disclosure by calling the above-described computer program stored in the storage apparatus 702. In some implementations, the input unit 703 may include a device such as a sensor that may be used to acquire item state information on the shelf, and the output unit 704 may be a device such as a display screen, or a speaker that may be used to display output information in the form of text, image, audio, and the like. Thus, the processor 701 may control the input unit 703 to acquire the state information of the item on the shelf from an external sensor, and control the output unit 704 to output the generated information, when calling the computer program to perform the information generation function.

In some implementations, the device for human-computer interaction may be a vending machine, and may further include a shelf for carrying items. The input unit 703 may include a gravity sensor disposed on the shelf for sensing a gravity change of the shelf, and a camera for acquiring an image of an item taken from the shelf. The input unit 703 may transmit acquired information to the storage apparatus 702 and the processor 701 via the bus 705. The processor 701 acquires gravity sensing data and the image of the item taken from the shelf, and calls the computer program from the storage apparatus 702 to perform the method for generating information of the above embodiment.

In some embodiments, the output unit 703 of the device 700 for human-computer interaction may include an electronic screen. The electronic screen is configured to provide an interaction interface to a user of the device 700 for human-computer interaction. The processor 701 further acquires identity information of the user through the interaction interface provided by the electronic screen, and associates generated order information to the user based on the identity information of the user.

In some embodiments, the camera further acquires biometric information of the user; and the processor further determines the identity information of the user based on the biometric information of the user, and associates the generated order information to the user based on the identity information of the user.

In some embodiments, the device 700 for human-computer interaction further includes: a container door, where the container door is configured to lock the shelf, and an electronic lock is arranged on the container door; the processor further sends an open instruction to the electronic lock on the container door, in response to a successful authentication of the user of the shelf based on the identity information.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network, or may be installed from the storage apparatus 702. The computer program, when executed by the processor 701, implements the above mentioned functionalities as defined by the method of the embodiments of the present disclosure. It should be noted that the computer readable medium described by the embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the embodiments of the present disclosure, the computer readable storage medium may be any physical medium containing or storing programs which may be used by a command execution system, apparatus or element or incorporated thereto. While in the embodiments of the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable signal medium is capable of transmitting, propagating or transferring programs for use by, or used in combination with, a command execution system, apparatus or element. The program codes contained on the computer readable medium may be transmitted with any suitable medium including but not limited to: wired, optical cable, RF medium etc., or any suitable combination of the above.

The computer readable medium may be included in the device for human-computer interaction, or a stand-alone computer readable medium not assembled into the device for human-computer interaction. The computer readable medium stores one or more programs. The one or more programs, when executed by the device for human-computer interaction, cause the device for human-computer interaction to: acquire gravity sensing data of a shelf carrying an item; and identify, in response to determining that the item on the shelf is taken based on the gravity sensing data, the taken item based on the gravity sensing data and an acquired image of the taken item, and generate order information of the taken item.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a first acquisition unit and a first generation unit. Here, the names of these units do not in some cases constitute a limitation to such units themselves. For example, the first acquisition unit may also be described as "a unit configured to acquire gravity sensing data of a shelf carrying an item."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating information, the method comprising:
   acquiring gravity sensing data of a shelf carrying an item in response to detecting a preset triggering operation; and
   identifying, in response to determining that the item on the shelf is taken based on the gravity sensing data, the taken item based on the gravity sensing data and an acquired image of the taken item to obtain an identification result of the taken item, and generating order information of the taken item, wherein the identifying the taken item based on the gravity sensing data and the acquired image of the taken item, comprises:
      determining a weight value of the taken item based on the gravity sensing data;
      determining an item matching the weight value as a candidate item or a combination of candidate items from a pre-stored item information database, wherein the item information database stores weights and images of all items on the shelf;
      comparing an attribute of the taken item in the acquired image with an attribute of the candidate item or the combination of candidate items, wherein the attribute of the taken item comprises at least one of a type, a packaging specification, or a brand identification; and
      determining the candidate item or the combination of candidate items as the item identified based on the acquired image, in response to determining that the attribute of the taken item matches the attribute of the candidate item or the combination of candidate items.

2. The method according to claim 1, wherein the method further comprises:
   acquiring identity information of a current user of the shelf; and
   associating the order information to the current user of the shelf based on the identity information.

3. The method according to claim 2, wherein the identity information of the current user of the shelf is acquired by at least one of:
   identifying the identity information of the user of the shelf based on acquired biometric information of the current user of the shelf; or
   acquiring the identity information of the current user of the shelf obtained by scanning an identity code provided by the current user.

4. The method according to claim 2, wherein, before acquiring gravity sensing data of the shelf carrying an item, the method further comprises:
   opening, in response to successful authentication of the current user of the shelf based on the identity information, a use permission to the shelf.

5. The method according to claim 4, wherein the opening a use permission to the shelf, comprises:
   sending an open instruction to a container door for locking the shelf.

6. The method according to claim 5, wherein the method further comprises:
   pushing the order information, in response to detecting that the container door is closed.

7. The method according to claim 1, wherein the method further comprises:

detecting whether a gravity increment of the shelf is consistent with a gravity reduction of the shelf detected last time, in response to determining that the item on the shelf is put back based on the gravity sensing data; and generating error prompt information, in response to determining that the gravity increment of the shelf is inconsistent with the gravity reduction of the shelf detected last time.

8. The method according to claim 1, wherein the attribute of the taken item comprises the type, the packaging specification, and the brand identification.

9. The method according to claim 1, wherein the image of the taken item comprises an appearance image of the taken item, and the item identified based on the acquired image is the item identified based on the appearance image;

the identifying the taken item based on the gravity sensing data and an acquired image of the taken item, comprises:

determining, based on the gravity sensing data, an amount of gravity change of the shelf after the item is taken;

identifying the taken item based on the acquired appearance image of the taken item, and finding a weight of the item identified based on the appearance image in a pre-stored item weight table; and determining that the item identified based on the appearance image is the taken item, in response to determining that the amount of gravity change of the shelf after the item is taken is consistent with the weight of the item identified based on the appearance image.

10. The method according to claim 9, wherein the method further comprises:

generating error prompt information, in response to determining that the amount of gravity change of the shelf after the item is taken is inconsistent with the weight of the item identified based on the appearance image.

11. The method according to claim 9, wherein the image of the taken item further comprises an image of an identification code of the taken item;

after identifying the taken item based on the acquired appearance image of the taken item, the identifying the taken item based on the gravity sensing data and an acquired image of the taken item, further comprises:

generating request information requesting the current user to scan the identification code of the taken item, in response to determining that the taken item is not identified from the appearance image;

acquiring an image of the identification code provided by the current user in response to receiving the request information, and determining a weight of an item identified by the image of the identification code; and determining the item identified by the image of the identification code being the taken item, in response to determining that the amount of gravity change of the shelf after the item is taken is consistent with the weight of the item identified by the image of the identification code.

12. The method according to claim 11, wherein the method further comprises:

generating error prompt information, in response to determining that the amount of gravity change of the shelf after the item is taken is inconsistent with the weight of the item identified by the image of the identification code.

13. An apparatus for generating information, the apparatus comprising:

at least one processor; and a memory storing instructions, wherein the instructions when executed by the at least one processor, cause the at least one processor to perform operations, the operations comprising:

acquiring gravity sensing data of a shelf carrying an item in response to detecting a preset triggering operation; and identifying, in response to determining that the item on the shelf is taken based on the gravity sensing data, the taken item based on the gravity sensing data and an acquired image of the taken item to obtain an identification result of the taken item, and generating order information of the taken item, wherein the identifying the taken item based on the gravity sensing data and the acquired image of the taken item comprises:

determining a weight value of the taken item based on the gravity sensing data;

determining an item matching the weight value as a candidate item or a combination of candidate items from a pre-stored item information database, wherein the item information database stores weights and images of all items on the shelf;

comparing an attribute of the taken item in the acquired image with an attribute of the candidate item or the combination of candidate items, wherein the attribute of the taken item comprises at least one of a type, a packaging specification, or a brand identification; and determining the candidate item or the combination of candidate items as the item identified based on the acquired image, in response to determining that the attribute of the taken item matches the attribute of the candidate item or the combination of candidate items.

14. A device for human-computer interaction, comprising:

one or more processors; and a storage apparatus, for storing one or more programs, wherein the one or more programs, when executed by the one or more processors, cause the one or more processors to perform operations, the operations comprising:

acquiring gravity sensing data of a shelf carrying an item in response to detecting a preset triggering operation; and identifying, in response to determining that the item on the shelf is taken based on the gravity sensing data, the taken item based on the gravity sensing data and an acquired image of the taken item to obtain an identification result of the taken item, and generating order information of the taken item by adding the taken item to an order list, wherein the identifying the taken item based on the gravity sensing data and the acquired image of the taken item, comprises:

determining a weight value of the taken item based on the gravity sensing data;

determining an item matching the weight value as a candidate item or a combination of candidate items from a pre-stored item information database, wherein the item information database stores weights and images of all items on the shelf;

comparing an attribute of the taken item in the acquired image with an attribute of the candidate item or the combination of candidate items, wherein the attribute of the taken item comprises at least one of a type, a packaging specification, or a brand identification; and determining the candidate item or the combination of candidate items as the item identified based on the acquired image, in response to determining that the attribute of the taken item matches the attribute of the candidate item or the combination of candidate items.

15. The device according to claim 14, wherein the device for human-computer interaction further comprises:
a shelf for carrying items, the shelf being provided with a gravity sensor for sensing a gravity change of the shelf; and
a camera, configured to acquire an image of an item taken from the shelf; and
wherein the processor is further configured to acquire gravity sensing data of the shelf and the image of the item taken from the shelf.

16. The device according to claim 15, wherein the device for human-computer interaction further comprises:
an electronic screen, configured to provide an interaction interface to a user of the device for human-computer interaction; and
the processor is further configured to acquire identity information of the user through the interaction interface provided by the electronic screen, and associate generated order information to the user based on the identity information of the user.

17. The device according to claim 16, wherein the camera is further configured to acquire biometric information of the user;
the processor is further configured to determine the identity information of the user based on the biometric information of the user, and associate the generated order information to the user based on the identity information of the user.

18. The device according to claim 16, wherein the device for human-computer interaction further comprises:
a container door, configured to lock the shelf, and an electronic lock is arranged on the container door;
the processor is further configured to send an open instruction to the electronic lock on the container door, in response to a successful authentication of the user of the shelf based on the identity information.

19. A non-transitory computer readable medium, storing a computer program thereon, wherein the program, when executed by a processor, implements the method according to claim 1.

* * * * *

UNITED STATES PATENT AND TRADEMARK OFFICE
CERTIFICATE OF CORRECTION

PATENT NO. : 11,328,568 B2  
APPLICATION NO. : 16/674492  
DATED : May 10, 2022  
INVENTOR(S) : Bao et al.

Page 1 of 1

It is certified that error appears in the above-identified patent and that said Letters Patent is hereby corrected as shown below:

On the Title Page

Column 1, Line 2, under Prior Publication Data, below "US 2020/0250949 A1 Aug. 6,2020" insert item (30) --Foreign Application Priority Data Feb. 01, 2019 (CN) ....... 20190105231.1--, as a new field entry.

In the Claims

In Column 22, Claim 13, Line 15, delete "item" and insert --item,--.

Signed and Sealed this  
Twenty-seventh Day of September, 2022

Katherine Kelly Vidal  
*Director of the United States Patent and Trademark Office*